UNITED STATES PATENT OFFICE.

GABRIEL A. BOBRICK, OF BOSTON, MASSACHUSETTS.

PROCESS OF DISSOLVING GUM-COPAL, &c.

SPECIFICATION forming part of Letters Patent No. 404,251, dated May 28, 1889.

Application filed September 15, 1888. Serial No. 285,524. (No specimens.)

*To all whom it may concern:*

Be it known that I, GABRIEL A. BOBRICK, a citizen of the United States, and a resident of Boston, in the county of Suffolk and State of Massachusetts, have invented certain new and useful Improvements in Varnish and Paint Compounds; and I do hereby declare that the following is a full, clear, and exact description of the invention, which will enable others skilled in the art to which it appertains to make and use the same.

Prior to my invention, as hereinafter described, it has not been possible to prepare varnishes or paints having for their base such gum-resins as amber, copal, or gum-resins of a similar nature, by dissolving these in naphtha, (benzine, kerosene, &c.,) for the reason that gum-resins of the class named are insoluble in mineral oils or their products. In all cases, therefore, when amber or copal varnishes or paints have been required, such varnishes or paints have been prepared by dissolving the amber, copal, &c., in a vegetable oil—such as turpentine or its derivatives—by the well-known process of distillation at a temperature of about 662° Fahrenheit, more or less, compounds of this nature being commonly known in the trade and among manufacturers as "vegetable-oil" varnishes or paints.

Owing to the cheapness of mineral oils and their derivatives, as well as for other reasons, it has long been a desideratum to produce, if possible, a mineral-oil paint or varnish with amber, copal, shellac, or similar tars for its base; and the object of my invention is to make it possible to dissolve these gum-resins in any of the well-known mineral oils or their derivatives—such as benzine, gasoline, kerosene, &c.—thereby producing a cheap but yet very superior varnish or paint adapted for all the purposes for which vegetable-oil paints or varnishes have heretofore been employed.

To carry my invention into effect I first dissolve a suitable quantity of rosin in naphtha or its products (benzine, kerosene, &c.) at a temperature varying from 150° to 250° Fahrenheit, more or less. The naphtha solution of rosin thus produced is then brought up to the boiling-point, at which it will be found readily to dissolve amber, copal, shellac, and such other gum-resins of the same category as are not soluble in the naphtha product when employed alone or without the use of rosin or its equivalent as a mediator.

This mineral-oil varnish or paint can be successfully applied and used upon wood, metal, and all other substances, and will be found not only to produce a smooth and fine finish fully equal to the best vegetable-oil varnishes, but it will be found to act as a preservative against rotting and other injurious effects due to atmospheric influences in a manner far superior to any other oils or varnishes having vegetable oils for their base.

Having thus described my invention, I claim and desire to secure by Letters Patent of the United States—

The herein-described method of dissolving resinous substances—such as amber, shellac, gum-copal, or their equivalents—in the products of naphtha—such as benzine or kerosene—which method consists in dissolving a suitable quantity of rosin in naphtha at a temperature between 150° and 250° Fahrenheit, and, while the mixture is boiling, adding thereto the amber, shellac, or gum-copal in suitable quantities, substantially as specified.

In testimony that I claim the foregoing as my own I have hereunto affixed my signature in presence of two witnesses.

GABRIEL A. BOBRICK.

Witnesses:
GERTRUDE W. TROWBRIDGE,
CHAS. HALL ADAMS.